US010726391B1

(12) United States Patent
Stephenson et al.

(10) Patent No.: US 10,726,391 B1
(45) Date of Patent: Jul. 28, 2020

(54) CUSTOMER CONTENT PERSONALIZATION (71) Applicant: United Services Automobile Association (USAA), San Antonio, TX (US)

(72) Inventors: Brady Carl Stephenson, Helotes, TX (US); Michael Frederick Willette, San Antonio, TX (US); Gunjan C. Vijayvergia, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 166 days.

(21) Appl. No.: 15/827,771

(22) Filed: Nov. 30, 2017

(51) Int. Cl.
*G06Q 10/10* (2012.01)
*G06F 16/25* (2019.01)
*G06F 16/435* (2019.01)
*H04M 1/725* (2006.01)

(52) U.S. Cl.
CPC ........... *G06Q 10/107* (2013.01); *G06F 16/25* (2019.01); *G06F 16/437* (2019.01); *H04M 1/72547* (2013.01); *H04M 1/72566* (2013.01); *H04M 1/72597* (2013.01)

(58) Field of Classification Search
CPC ..... G06Q 10/107; G06F 16/25; G06F 16/437; H04M 1/72547; H04M 1/72566; H04M 1/72597
See application file for complete search history.

(56) References Cited

U.S. PATENT DOCUMENTS

| 2004/0002932 | A1* | 1/2004 | Horvitz | G06Q 10/107 |
| | | | | 706/46 |
| 2013/0346246 | A1* | 12/2013 | Patel | G06Q 20/108 |
| | | | | 705/26.1 |
| 2015/0185972 | A1* | 7/2015 | Ash | G16H 10/60 |
| | | | | 715/808 |
| 2017/0061101 | A1* | 3/2017 | Hampden | G06Q 50/22 |
| 2017/0242552 | A1* | 8/2017 | Kirov | H04W 68/005 |
| 2018/0013844 | A1* | 1/2018 | Foged | H04L 51/32 |
| 2018/0239770 | A1* | 8/2018 | Ghotbi | G06F 3/0482 |

* cited by examiner

*Primary Examiner* — Arvin Eskandarnia
*Assistant Examiner* — Chhian (Amy) Ling
(74) *Attorney, Agent, or Firm* — Fletcher Yoder, P.C.

(57) ABSTRACT

The present disclosure relates generally to systems and methods for delivering personalized content to a customer. More specifically, the present disclosure relates to systems and methods for providing notifications related to the needs of a customer. A content management system may determine the needs of a customer as they relate to relevant products and/or services offered by one or more business entities, determine and prioritize actions that may fulfill these needs, and deliver personalized content to the customer based on the customer's information. Accordingly, the systems and techniques provided herein may improve the efficiency and reduce the time involved with delivering effective content to a customer.

20 Claims, 3 Drawing Sheets

CUSTOMER CONTENT PERSONALIZATION

BACKGROUND

The present disclosure relates generally to systems and methods for delivering personalized content to a customer. More specifically, the present disclosure relates to systems and methods for providing notifications related to the needs of a customer via a content management system.

Modern businesses may offer an array of products and service options to a customer. As such, marketing, updates, and additional information received by the customer related to the products and service options may become cumbersome and ineffective. That is, content delivered to the customer may lose its impact and efficacy as the customer continues to receive a high volume of information and/or receives irrelevant information. Further, it may be inefficient and time consuming for a business to deliver information relating to each product and service option to the customer. Accordingly, it is now recognized that improved methods of delivering content to the customer are desired.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a system for efficiently employing a communication processing system includes one or more databases and a processor configured to correlate needs of a customer to information related to the customer contained in the one or more databases. The processor is further configured to correlate corresponding actions to the needs of the customer, wherein the corresponding actions would satisfy the needs of the customer. The processor is also configured to prioritize the corresponding actions. Further, the processor is configured to select content that conveys information about a highest priority action from the prioritized corresponding actions and is configured to output a notification with the content to a customer computing device.

In one embodiment, a system for efficiently employing a communication processing system includes one or more databases and a processor configured to correlate a plurality of needs of a customer to information related to the customer from the one or more databases in response to receipt of an input. The processor is further configured to correlate a plurality of corresponding actions to the plurality of needs of the customer, wherein the plurality of corresponding actions would satisfy the plurality of needs of the customer. Further, the processor is configured to prioritize the plurality of corresponding actions, to select one of the plurality of corresponding actions, and to select appropriate content from a database based on the selected action and the information related to the customer. The processor is further configured to output a notification to the customer via a customer computing device based on the appropriate content selected.

In one embodiment, a method for efficiently employing a communication processing system includes correlating, using a processor, needs of a customer to information from a database related to the customer. Further, the method includes correlating corresponding actions to the needs of the customer, wherein the corresponding actions would satisfy each of the needs of the customer. The method further includes using the processor to prioritize the corresponding actions and to select content that conveys information about a highest priority action from the prioritized corresponding actions. Further, the method includes outputting, using the processor, a notification with the selected content to a customer computing device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure relates generally to improved systems and methods for generating notifications with personalized content related to a set of products and/or services to a customer. More specifically, present embodiments are directed to generating, prioritizing, evaluating, and improving content delivered to the customer via a computing device. In some embodiments, for example, a content management system may interface with one or more databases to determine a set of customer needs (e.g., relevant products and/or services suitable for the customer) based on information related to the customer. The content management system may then use the one or more databases to determine a set of actions (e.g., purchase a product, enroll in a service) that may fulfill the set of customer needs and may prioritize the actions based on the customer's information. Further, the content management system may utilize the one or more databases to generate and/or modify content (e.g., information), according to available content, the customer's information, and the customer's needs, to create a suitable notification that conveys the prioritized actions to the customer in a personalized manner. That is, any suitable combination of the customer needs, the actions identified based on the customer needs, the prioritization of the identified actions, and the generated content may be personalized to a specific customer or set of customers. Further, the content management system may evaluate the efficacy of the notifications sent to the customer and update the information in the one or more databases accordingly so that subsequent notifications to the customer may be improved. As such, the content management system may deliver content via a notification to the customer with improved efficacy, and as a result of delivering the improved notifications, the content management system may improve the efficiency and reduce the time involved with delivering content to a customer. That is, because the notification quality is improved, the content management system may send fewer notifications to the customer before they are effective, and as a result, time and resources in the content management system may become more available. Additional details regarding the content management system and various processes performed by the content management system will be described below with reference to FIGS. 1-4.

Figure 1:
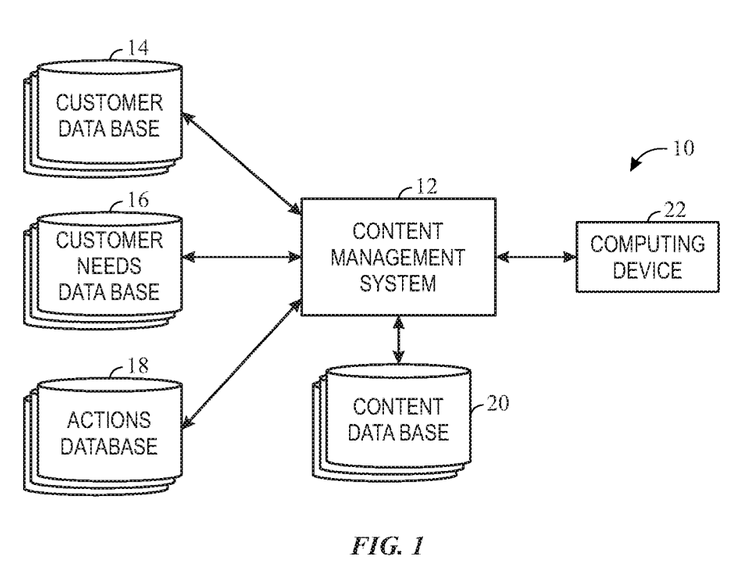
FIG. 1 illustrates a block diagram of a personalized content system, in accordance with embodiments described herein.

By way of introduction, FIG. 1 illustrates a block diagram of a personalized content system 10 (e.g., framework) that may generate, prioritize, evaluate, and update content personalized for a customer. As such, the personalized content system 10 may include a content management system 12, a customer database 14, a customer needs database 16, an actions database 18, a content database 20, and a computing device 22. The content management system 12, in certain embodiments, may be a cloud-based computing system that includes a number of computers that may be connected through a real-time communication network, such as the Internet. In one embodiment, large-scale analysis operations may be distributed over the computers that make up the cloud-based computing system. Although the content management system 12 is described above as a cloud-based computing system, the content management system 12 may be any suitable computing device that is capable of communicating with other devices and processing data, in accordance with the techniques described herein.

In one embodiment, the content management system 12 may communicatively couple to the customer database 14. The customer database 14 may include data (e.g., information) regarding a number of different customers. As such, the customer database 14 may include information related to the identity of each customer. For example, in an embodiment, data regarding the identity of a customer may include a name, title, a set of services and/or products used by the customer, and the like. In an embodiment, the information regarding the identity of the customer may further include an email address, phone number, an identification number or code, and the like associated with a respective customer. The customer database 14 may further include information that may identify the customer's needs. For example, in some embodiments, the customer database 14 may include financial information related to the customer, a marital status, and/or information regarding the customer's assets, such as the value of the customer's house. The needs of the customer that may relate to and/or be anticipated by such information may correspond to products and/or services suitable for or potentially useful to the customer, as will be described. Further, the customer database 14 may contain data related to the customer's history. In some embodiments, for example, the customer database 14 may include data regarding a date the customer enrolled and/or subscribed to a service, a history (e.g., list) of actions performed by the customer, a history of behaviors of the customer, and the like. The history of actions performed by the customer may correspond to a set of actions relevant to the products and/or services provided to and/or used by the customer, as will be described in further detail. Further, the history of behaviors of the customer may correspond to behaviors, such as responses to personalized notifications (e.g., content) that may influence the generation and/or modification of future content, as will be described.

The content management system 12 may additionally or alternatively communicate with the customer needs database 16. In some embodiments, the customer needs database 16 may include data regarding the needs of a customer, which may correspond to a set of products and/or services suitable for the customer. For example, the customer needs may include a car insurance policy renewal, a mortgage and/or loan application, and a check deposit, among other things. In some embodiments, the information related to each customer need may include an identifier (e.g., name), a product and/or service corresponding to the need, and a set of triggers (e.g., conditions) that may produce the need. For example, in the case of the car insurance policy renewal, "Car insurance renewal" may represent an identifier, an insurance policy delivered by an insurance department and/or business may represent the service, and the expiration of a car insurance policy, the purchase of a new car, and/or the availability of a new car insurance policy may represent the set of triggers corresponding to the respective customer need. As such, the needs database 16 may maintain information regarding customer needs corresponding to a variety of services and/or products.

Although the foregoing description of the example customer need is related to a car insurance policy renewal, it should be noted that any other suitable demand for a service and/or product may also be described and tracked as a customer need. That is, the embodiments described herein should not be limited to the examples expressly recited.

With this in mind, the actions database 18 may include data regarding suitable actions a customer may take to fulfill a customer need. That is, the actions database 18 may contain information regarding a set of operations, or tasks, that a customer may complete to act upon a customer need. For example, with respect to the example of car insurance renewal as a customer need, an operation a customer may complete to act upon this need may include any combination of communicating with an insurance agent, navigating to a website to fill out an insurance renewal form, setting up an automatic payment plan, or the like. As such, in some embodiments, the actions database 18 may include an identifier (e.g., name), a customer need corresponding to the action, and a method (e.g., instructions) to complete the action for each action in the actions database 18. Thus, in the context of the previous example, the action of communicating with an insurance agent may be identified as "Talk to insurance agent," may correspond to the customer need to renew a car insurance policy, and may include instructions for a customer to call, chat online, and/or set up an appointment to meet with a local insurance agent.

While the actions database 18 may maintain information regarding the operations a customer may perform to act upon a customer need, the content database 20 may maintain content (e.g., messages), including a set of content guidelines to appropriately convey the suitable operations to a customer. That is, the content database 20 may include dynamically and/or statically created content corresponding to an action. As such, the content database 20 may contain content in the form of information, advice, and/or marketing, among other things, related to the action. Further, as the content management system 12 may determine customer needs and their corresponding actions based on customer information that may relate to any suitable number of business entities (e.g., separate companies or separate business departments within the same company), the content may relate to and/or be created by any one of the business entities, or a combination thereof. In some embodiments, for example, the content database 20 may contain marketing content for a financial business entity and/or advice content for a healthcare insurance business entity.

In some embodiments, the content guidelines may include a set of templates, typefaces, languages, verbiage, layouts, styles, and/or modes of delivery, among other things, to manage the generation of dynamic content. Further, the content may be dynamically formatted (e.g., updated) to better convey the method of an action to a customer based on a customer's preferences and/or information. As such, content may be presented, according to the suitable content guidelines, in one or many of the available languages. In some embodiments, for example, a customer may receive content formatted in a single language. In other embodiments, a customer may receive content formatted in one language, additional content formatted in another language, and/or content containing multiple languages. Further, content guidelines regarding verbiage may include information regarding colloquialisms relevant to a customer, a level of formality that may be preferred by a customer, vocabulary suggestions, and the like. For example, one customer may prefer short, abbreviated text (e.g., thx (thanks), msg (message), @ (at)) with little punctuation, while another customer may prefer more formally formatted messages with unabbreviated text and clear punctuation. Further, a customer may receive content via one or many modes of delivery, such as short messaging service (SMS) (e.g., text message), call, application alert, and/or electronic mail (e.g., e-mail). The modes of delivery may correspond to the capabilities of the computing device 22, as will be described. Thus, with the information in the content database 20, a notification delivered via a specified mode of delivery to a customer may contain personalized content relevant to the customer. For example, in some embodiments, a customer with the customer need of car insurance policy renewal may receive a brief text message reminder with a hyperlink to a website to complete the action of filling out an insurance policy form online. In such embodiments, a different customer with the same need may receive a detailed email and an insurance policy form as an attachment. Thus, each customer may receive targeted, personalized content to perform an action that may fulfill each customer's respective need.

While the embodiments herein describe separate databases for the customer database 14, the customer needs database 16, the actions database 18, and the content database 20, it should be understood by one skilled in the art that embodiments may include any suitable number of databases to store the relevant information regarding the customer, customer needs, actions, and content. As such, fewer or additional databases may be used in the personalized content system 10.

To determine a customer need, the corresponding actions, and the content relevant to a customer, the content management system 12 may process an input the customer provides via the computing device 22 and analyze the customer's information from the customer database 14. That is, the content management system 12 may receive an input from a customer that may update the customer's information in the customer database 14. Based on this input, the content management system 12 may determine whether a notification (e.g., alert) should be sent to the customer (e.g., a personal device). That is, the content management system 12 may determine whether a customer need is applicable to the customer via the customer needs database 16. The content management system 12 may further determine suitable actions from the actions database 18 that may fulfill the customer's needs, and the content management system 12 may determine suitable content from the content database 20 to appropriately deliver information about the suitable actions to the customer by way of a notification. Thus, in one embodiment, the content management system 12 may perform various types of analyses in accordance with present embodiments on the data acquired from the customer database 14, the customer needs database 16, the actions database 18, and the content database 20 to send fewer, more effective notifications to the customer via the computing device 22, and thereby, increase the performance and efficiency of the content management system 12, itself, by freeing resources and reducing time consumption. For example, existing systems may face issues regarding inefficient use of resources (e.g., processor 34 computations, memory 36, and/or communication 32 resources) as they send and store information to and from the customer separately for each of a number of business entities (e.g., separate companies or business departments within the same company). Further, the amount of content generated by each of the number of business entities may become cumbersome to the customer receiving the content, making each notification less effective, which may result in additional (e.g., follow-up) notifications. As such, by analyzing (which may include prioritizing) the customer information that may relate to any number of business entities in a single system, the content management system 12 may eliminate duplicate resources and information used across business entities and send more effective content to the customer.

The computing device 22 may include any suitable processor-based computing system, such as a desktop computer, a laptop computer, a mobile computing device (e.g., smart phone), a tablet computing device, and the like. In any case, the computing device 22 may receive a notification from the content management system 12 and may provide an indication that the notification was received. The indication may be a ring tone, a vibration pattern, a visualization, or the like. In some embodiments, the notification may activate an application or program stored on the computing device 22 despite the computing device 22 being in a sleep or low power mode to increase the likelihood that the customer will take note of the notification.

Although the content management system 12 is described as sending notifications to the computing device 22, in some embodiments, the content management system 12 may be a computing device associated with the customer. As such, the content management system 12 may be accessible to the customer and may generate visualizations and alerts to notify the customer regarding suitable actions that may satisfy a customer need.

Figure 2:
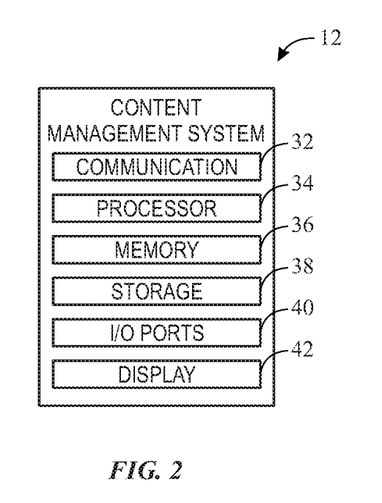
FIG. 2 illustrates a block diagram of the content management system that may be part of the personalized content system of FIG. 1, in accordance with embodiments described herein.

Further, to perform some of the actions set forth above, the content management system 12 may include certain components to facilitate these actions. FIG. 2 is a block diagram of example components within the content management system 12. For example, the customer system 12 may include a communication component 32, a processor 34, a memory 36, a storage 38, input/output (I/O) ports 40, a display 42, and the like. The communication component 32 may be a wireless or wired communication component 32 that may facilitate communication between the customer database 14, the customer needs database 16, the actions database 18, the content database 20, the computing device 22, and the like. The processor 34 may be any type of suitable computer processor or microprocessor capable of executing computer-executable code. The processor 34 may also include multiple processors that may perform the operations described below.

The memory 36 and the storage 38 may be any suitable articles of manufacture that can serve as media to store processor-executable code, data, or the like. These articles of manufacture may represent non-transitory, computer-readable media (e.g., any suitable form of memory or storage) that may store the processor-executable code used by the processor 34 to perform the presently disclosed techniques. The memory 36 and the storage 38 may also be used to store data, various other software applications, and the like. For example, the memory 36 and the storage 38 may not only store the processor-executable code used by the processor 34 to perform various techniques described herein but code for other techniques as well. It should be noted that non-transitory merely indicates that the media is tangible and not a signal.

The input/output (I/O) ports 40 may be interfaces that may couple to other peripheral components such as input devices (e.g., keyboard, mouse), sensors, input/output (I/O) modules, and the like. The display 42 may operate to depict visualizations associated with software or executable code being processed by the processor 34. In one embodiment, the display 42 may be a touch display capable of receiving inputs from a user of the content management system 12. The display 42 may be any suitable type of display 42, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the content management system 12.

It should be noted that the components described above with regard to the content management system 12 are exemplary components and the content management system 12 may include additional or fewer components as shown. Additionally, it should be noted that the computing device 22 may also include similar components as described as part of the content management system 12.

Figure 3:
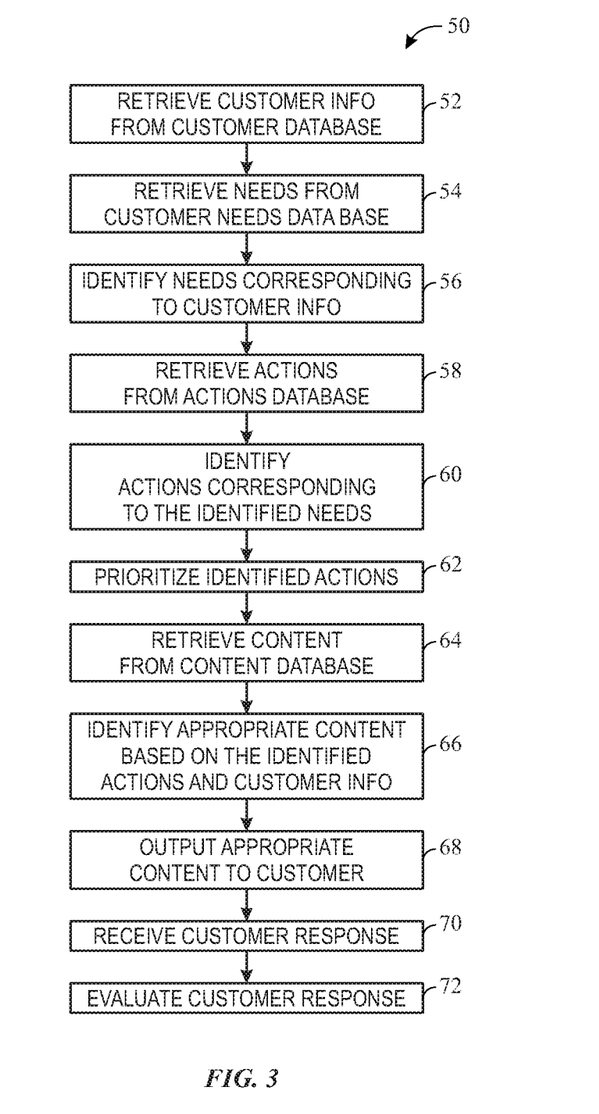
FIG. 3 illustrates a flow chart of a method for generating content in the personalized content system of FIG. 1, in accordance with embodiments described herein.

With the foregoing in mind, FIG. 3 illustrates a flow chart of a method 50 for sending a personalized notification to the computing device 22, in accordance with embodiments described herein. Although the following description of the method 50 is described in a particular order, which represents a particular embodiment, it should be noted that the method 50 may be performed in any suitable order. Moreover, although the following description of the method 50 is described as being performed by the content management system 12, it should be noted that the method 50 may be performed by any suitable computing device.

The method 50 may be triggered (e.g., initiated) by any of a number of suitable events. In one embodiment, for example, the content management system 12 may receive an input that may trigger the method 50. The input may involve an update to a customer's information that may impact the customer information database 14 (e.g., the purchase of a new car), an update to the customer needs supported by the customer needs database 16 (e.g., a new product and/or service became available to customers), an update to actions available to the customer in the actions database (e.g., new methods became available to satisfy customer need), an update to the content available to the customer in the content database 20 (e.g., the content management system 12 supports a new mode of delivery for content), or a combination thereof. Further, the input received from the computing device 22 may be received from the computing device 22 or the content management system 12, itself.

The computing device 22 and/or the content management system 12 may monitor and automatically determine suitable inputs to trigger the method 50. In some embodiments, for example, the computing device 22 and/or the content management system 12 may receive signals from a sensor (e.g., a global positioning system (GPS)) and determine suitable inputs to trigger the method 50 based on the signals received from the sensor. For example, the computing device 22 may utilize a GPS to determine an approximate location of the customer. That is, the computing device 22 (e.g., a mobile device) may determine its own location via a GPS interface to determine the approximate location of the customer. The computing device 22 may send the content management system 12 an update providing the location of the customer as an input. The content management system 12 may then compare the current location of the customer to a previous location of the customer stored in the customer information database 14, and in some embodiments, if the two locations do not match, the content management system 12 may initiate the method 50 to process how the change in location may impact the content delivered to the customer. Other sensors (e.g., an accelerometer, a pedometer, a heart rate monitor) may additionally or alternatively couple to the computing device 22 and/or the content management system 12 to provide relevant inputs that may impact the content delivered to the customer, such as, for example, health care content.

Further, in some embodiments, the computing device 22 may detect a request initiated by a customer to interact with an application running on the computing device 22. The computing device 22 may send this request to the content management system 12, which may initiate the method 50 to determine if there is any relevant content that should be delivered to the customer. In another embodiment, the content management system 12 may regularly perform the method 50 with a certain periodicity (e.g., every 1, 8, 12, 24, 48 hours, every week, or every two weeks). In such embodiments, the input to initiate the method 50 may originate from the content management system 12, itself.

Referring now to FIG. 3, once the method 50 is initiated by a suitable event, at block 52, the content management system 12 may retrieve customer information from the customer database 14. As discussed, the information maintained by the customer database 14 may include identification information, information regarding a customer's financial standing and/or other situation (e.g., that may correspond to a customer need), information regarding a customer's history, and information regarding a current location (e.g., based on a signal from a GPS), among other things.

At block 54, the content management system 12 may retrieve a set of needs from the customer needs database 16. The needs may include information regarding the needs of a customer corresponding to a product and/or service, a set of conditions that may trigger each need, and the like.

Thus, at block 56, the content management system 12 may compare the customer information to the customer needs to identify a set of needs corresponding to the customer. More specifically, the content management system 12 may determine if the customer information satisfies the conditions that correspond to a customer need. For example, a customer who is buying a new house may satisfy a condition to apply for a mortgage (e.g., a customer need). As the customer information retrieved from the customer database 14 may include a variety of data related to a customer, more than one customer need may align with the customer information. That is, for example, the same customer buying a new house may additionally own a car with an expiring insurance policy. In such cases, the customer may have both a need to apply for a mortgage and a need to renew the car insurance policy. Thus, the content management system 12 may identify several needs for an individual customer.

In addition to retrieving the customer's information and identifying the customer's needs, at block 58, the content management system 12 may retrieve a set of actions from the actions database 18. The actions may include information regarding operations (e.g., tasks) that may be completed to fulfill a customer need. Thus, at block 60, the content management system 12 may identify actions corresponding to the needs identified at block 56. That is, the content management system 12 may identify a suitable action or set of actions corresponding to each of the identified customer needs. As a customer may have several needs and each need may have several actions capable of satisfying the need, the content management system 12 may then prioritize and/or sort (e.g., according to a priority level) the identified actions at block 62. As such, the content management system 12 may selectively remove and/or order the identified actions based on several factors. In some embodiments, for example, the content management system 12 may prioritize the actions based on a deadline to complete each action, an estimated duration it takes to complete the action, an importance of completing each action, consequences for failing to complete each action, and the like. The deadline, the estimated duration, the importance of completing an action, the consequence for failing to complete an action, and/or other factors influencing the priority of an action may be predefined (e.g., set by an operator or determined by the content management system 12 based at least in part on the customer's information, models, and/or empirical data, such as empirical data related to an actual duration for the customer or multiple other customers to complete each action or similar actions one previous occasions) and stored in a database of the content management system 12. Additionally, or in the alternative, the customer information in the customer database 14 may include a customer's preferences regarding the priority of certain actions. As such, the customer may, for example, set an order of importance corresponding to certain needs and their respective actions. In other embodiments, the content management system 12 may determine the customer's preferences regarding the priority of certain actions based on the customer information.

If the customer has any actions identified that are determined to be high enough priority to notify the customer, at a certain time (e.g., according to a predefined schedule), or following receipt of an input, the content management system 12 may, at block 64, retrieve content (e.g., to convey information about or to facilitate the action with the highest priority) from the content database 20 in order to generate a notification to send to the customer via the computing device 22. The content retrieved may include content guidelines, such as, verbiage, typefaces, and layouts, among other things. The content guidelines may further include templates for messages corresponding to an action. As such, the content database 20 may retrieve content that may dynamically and/or statically be created. Further, the content retrieved may be dynamically formatted, according to suitable content guidelines, to better convey the method of an action to a customer.

At block 66, content suitable for the customer may be identified from the retrieved content based on the customer information and the identified actions. That is, the content management system 12 may identify content corresponding to the identified, prioritized actions. In some embodiments, the content may include information, advice, and/or marketing, among other things, related to the actions. Further, as the content management system 12 may determine customer needs and their corresponding actions based on customer information that may relate to any suitable number of business entities (e.g., separate companies or business departments within the same company), the content may relate to any one of the business entities, or a combination thereof.

Further, in some embodiments, the content management system 12 may customize (e.g., format) and/or create the notifications based on the suitable content guidelines from the retrieved content and the customer preferences retrieved from the customer information. In such embodiments, for example, the content management system 12 may alter the verbiage of the content (e.g., in the notification) related to an action to make it more accessible to a customer, while keeping the meaning of the content generally the same. For example, in some cases, a first customer may receive a message with abbreviated text (e.g., "thx" instead of "thanks"), based on the information associated with the first customer, while a second customer may receive content corresponding to the same action that contains unabbreviated text (e.g., "thanks"), based on the information associated with the second customer. Further, as discussed, the content guidelines may additionally or alternatively alter the typeface, layout, or mode of delivery of the notification based on the customer information retrieved from the customer database.

The content management system 12 may then output the appropriate notification, including the content tailored to the customer's preferences to the customer at block 68. After sending the notification, the content management system 12 may provide an indication to the customer that the notification was received at the computing device 22. The indication may be a ring tone, a vibration pattern, a visualization, or the like.

In an embodiment, a notification may cause the computing device 22 to open or execute an application. For example, in an embodiment, the notification may cause the computing device 22 to display a visualization of the content in the form of a text-based window or application that may display the appropriate content to the customer. In an embodiment, the customer may already have an application related to the notification open the computing device 22. In such cases, the notification may appear within the application (e.g., as a pop-up display, as a header, or the like) to display a visualization of the content to the customer. Further, the manner by which the notification is delivered to the customer may be determined by the appropriate content identified at block 66. That is, the content management system 12 may determine the mode of delivery for the content based on the customer information and the retrieved content. As such, the content management system 12 may send the notification via e-mail, text messages, application notifications, or a combination thereof.

In certain embodiments, the computing device 22 may confirm whether the customer has received the notification based on whether the computing device 22 receives an input related to the notification (e.g., acknowledgement) or the like. The computing device 22 may then transmit a message to the content management system 12 indicative of the confirmation. Additionally, or in the alternative, the computing device 22 may send a customer response to the notification at block 70. That is, the computing device 22 may monitor and communicate the customer's interaction with the notification. As such, the computing device may communicate to the content management system 12 whether the customer has completed the action recommended in the content of the notification, how long the customer took to initiate the action upon receiving the notification, and the like. The customer response may further include survey responses and/or feedback directly from the customer related to the effectiveness of the notification. As such, the content management system 12 may more efficiently utilize its processing and resource capabilities. For example, in some embodiments, the content management system 12 may delay the processing and/or sending of an additional notification before a customer has received and/or responded to the notification. That is, the content management system 12 may shift its processing and resources to other tasks (e.g., other customers) while it waits for an input related to the notification, as the input may impact the additional notification.

Thus, with feedback from the computing device 22, the content management system 12 may, at block 72, evaluate the customer's response. Evaluation of the customer's response may include comparing the customer's response to certain thresholds, which may be stored in the customer database 14, as a measure of success. For example, no customer response and/or a lack of customer response after a set duration (e.g., two days) following the receipt of the notification, may indicate that the notification was unsuccessful in aiding the customer to satisfy a need. Further, in some embodiments, the customer may directly provide feedback indicating whether or not a notification was helpful and/or ways the notification may be improved. As such, the content management system 12 may determine whether or not the notification sent to a customer should be modified. In the case that modifications to the notification are desirable, the content management system 12 may determine methods to improve the notification. For example, in some embodiments, the content management system 12 may update the customer information in the customer database 14 to better reflect the customer's preferences with respect to the notification's content. That is, the content management system 12 may update the verbiage, language, and/or style (e.g., adjust the format), among other things, of the personalized content delivered to the customer so that the customer response to subsequent notifications is improved. The content management system 12 may further update the priority of actions related to the customer based on the fulfillment or failure to satisfy a need after a notification was received. For example, actions related to needs that are still pending after the notification was received may be updated to a higher priority, and the next notification that is sent may provide content that conveys information about the action with the highest priority. However, other actions may be updated to a lower priority. For example, if the customer was uninterested in the notification (e.g., did not interact with the notification, such as by clicking a link in the notification), then the action associated with the notification may be updated to a lower priority to reduce the number of ineffective or unwanted notifications.

As a result of the evaluation of the efficacy of the notifications sent to each customer and the continual updates the content management system 12 may make to the notifications based on such evaluations, the content management system 12 may continually increase its own efficiency. That is, while the content management system 12 reduces time spent and resources (e.g., processing resources in the processor 34) used to send notifications to a customer by prioritizing and personalizing data (e.g., sending reduced, more effective content), the content management system 12 may further improve its efficiency and performance each time it updates the information associated with a customer. In other words, as the content management system 12 continues to collect more information regarding a customer, the efficacy of the notifications sent to the customer may improve and the computational time and power to generate the notifications may decrease.

Figure 4:
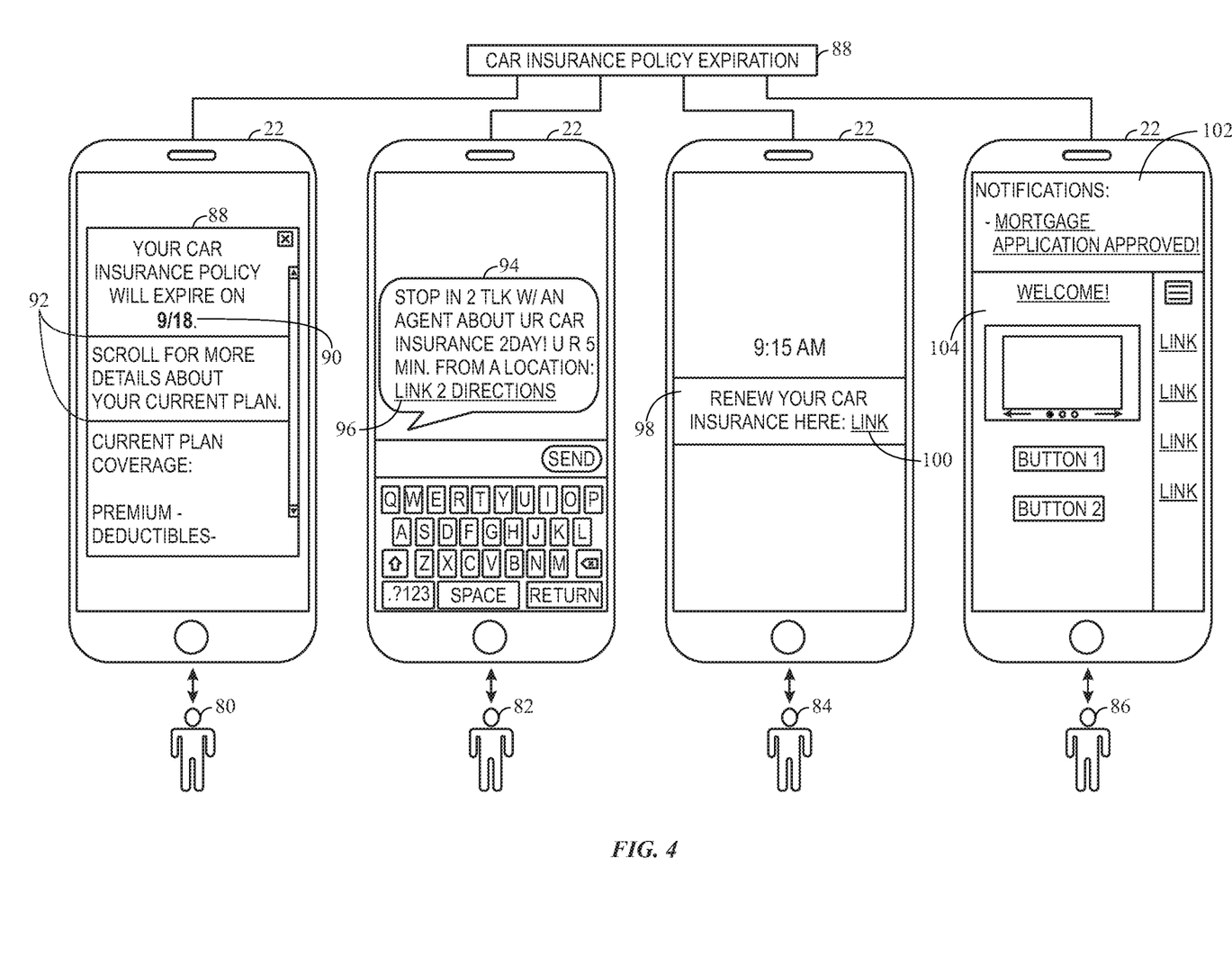
FIG. 4 illustrates examples of the content that may be generated using the method of FIG. 3, in accordance with embodiments described herein.

Turning now to FIG. 4, an embodiment of the method 50 as it may be applied to different customers with a common customer need is illustrated. In the illustrated embodiment, each of four customers (e.g., 80, 82, 84, 86) share a customer need 88 of car insurance policy expiration, and the content management system 12 delivers personalized content to a respective computing device 22 (e.g., a smart phone) associated with each customer (e.g., 80, 82, 84, 86) based on the customer need 88 and the customer information associated with the respective customer.

For example, the content management system 12 may receive an input from the computing device 22 of a first customer 80 communicating that the first customer 80 logged into an application associated with the content management system 12. The content management system 12 may receive a second input from the computing device 22 of a second customer 82 indicating that the location, determined via a GPS interface, of the second customer 82 is proximate to an insurance location. In the case of a third customer 84, instead of or in addition to receiving an input from the customer device 22, the content management system 12 may generate a third input, itself. That is, the content management system 12 may be configured to periodically generate an input on a regular basis. The customer management system 12 may further receive a fourth input from the computing device of a fourth customer 86 upon the fourth customer 86 logging into the application associated with the content management system.

Each of the inputs generated and/or received by the content management system 12 may trigger the content management system 12 to initiate the method 50. As such, after receiving and/or generating an input, the content management system 12 may determine that each customer (e.g., 80, 82, 84, and 86) has the customer need 88 (e.g., at blocks 52, 54, and 56) to address a car insurance policy expiration, as well as other customer needs. For example, in the case of the fourth customer 86, the content management system 12 may determine an additional customer need to get a mortgage application approved.

In the case of the first customer 80, the third customer 84, and the fourth customer 86, the content management system 12 may determine the customer need 88 based on the current date and the date of the customer's car insurance policy expiration, which may be included as customer information in the customer database 14. That is, the customer information may include a date by which the customer may receive a notification regarding the car insurance policy expiration (e.g., one month before expiration) based on the customer's history of car insurance policy renewal. In the case of the second customer 82, the content management system 12 may, for example, additionally or alternatively use the location of the second customer 82, which may be included as customer information in the customer database 14, to determine that the second customer 82 has the customer need 88.

The content management system 12 may then determine and prioritize actions that may correspond to the customer need 88 and/or other identified customer needs (e.g., at block 58, 60, and 62). While the customer need 88 to address a car insurance policy expiration may be associated with each of the illustrated customers (e.g., 80, 82, 84, and 86), an action corresponding to the customer need 88 and the priority of the action may vary between customers based on respective customer information and/or other customer needs associated with the customer. As such, an appropriate action for the first customer 80 to satisfy the customer need 88 may include reviewing a current car insurance policy, as the content management system 12 may identify that the first customer 80 may want to make changes to the current car insurance policy before renewing it. An appropriate action for the second customer 82 may include visiting a car insurance agent in-person to discuss car insurance policies, as the location of the second customer 82 may be determined to be proximate to an insurance location. Further, the content management system 12 may associate the action of renewing a car insurance policy online with the third customer 84.

As the content management system 12 may identify multiple customer needs for the fourth customer 86, the content management system 12 may identify multiple actions for the fourth customer 86. Thus, an appropriate action for the fourth customer 86 may include reviewing a submitted mortgage application, and because the fourth customer 86 may have an automatic payment scheduled for a car insurance policy, an additional action appropriate for the fourth customer 86 may include acknowledging the automatic payment (e.g., updating the automatic payment, if necessary, or allowing the automatic payment to occur). Further, because the fourth customer 86 may have multiple customer needs and/or multiple identified actions, the content management system 12 may prioritize the identified actions based on the customer's preferences (e.g., at block 62). In some embodiments, the content management system 12 may ignore the actions that are not the highest priority. As such, the content management system 12 may determine that reviewing the submitted mortgage application is the highest priority action for the fourth customer 86 and may ignore the action to acknowledge the automatic payment.

With appropriate actions identified and prioritized for each customer (e.g., 80, 82, 84, and 86), the content management system 12 may then identify and output appropriate content to a respective customer via a notification including content related to the appropriate actions (e.g., at block 66). As such, the first customer 82 may receive a pop-up notification 88 in the application the first customer 82 opened. The pop-up notification 88 may include the details regarding the current car insurance policy of the first customer 80 so that the first customer 82 may review the current car insurance policy, according to the identified appropriate action. Thus, the mode of delivery of the content for the first customer 80 may involve the pop-up notification 88 within an application associated with the content management system 12. Further, the pop-up notification 88 may include modified font (e.g., bold-face fonts) and a structured layout 92 to present the notification to the first customer 80 in a manner that is easily understood and/or preferred by the first customer 80. The second customer 82, may receive a text message notification 94 featuring abbreviated language and a link 96 to a map and/or directions to an insurance agency. As such, the second customer 82 may receive a notification with a different mode of delivery and content that is personalized and relevant to the second customer's 82 information. Further, the third customer 84 may receive an application alert 98 from the application associated with the content management system 12 as a notification, regardless of whether the third customer 84 is actively using the application or not. As such, in the illustrated embodiment, the application alert 98 appears on the computing device 22 while the computing device 22 is in an idle state. Further, the application alert may include a hyperlink 100 to a website that may enable the third customer 84 to renew his car insurance, and as such, the personalized content (e.g., the application alert 98) delivered to the third customer 84 may enable the third customer 84 to complete appropriate actions to fulfill the customer need 88. Last, the fourth customer 86 may receive the appropriate content through a notification block 102 incorporated in an application 104 associated with the content management system. That is, upon opening the application 104, the fourth customer 86 may be presented with a notification block 102 that may direct the attention of the fourth customer 86 to personalized content displaying the appropriate identified actions for the fourth customer 86. As such, the fourth customer 86 may receive a notification related to the mortgage application. However, the fourth customer 86 may not receive content related to the automatic payment for the car insurance policy because the priority of acknowledging the automatic payment was lower than the priority of the mortgage application. It should also be appreciated that, in some embodiments, the fourth customer 86 may receive multiple notifications for multiple actions (e.g., 2, 3, 4, 5, or more) simultaneously or sequentially. For example, the notification related to the mortgage application and the notification related to the car insurance policy may be provided to the fourth customer 86 simultaneously or sequentially, such as at certain time intervals (e.g., one in the morning and one in the afternoon) or one after the other (e.g., the notification related to the car insurance policy is provided immediately after the notification related to the mortgage application is read or the action set forth in the notification is completed the customer). As such, the content management system 12 may improve operation efficiency by notifying the customer at more suitable opportunities, which may reduce the number of notifications processed and sent to the customer. The content management system 12 may further improve efficiency by sending notifications to the customer at time intervals when its processing capabilities and resources are most available, allowing the content management system 12 to handle other responsibilities (e.g., other customers) at other times.

To complete the method 50, the content management system 12 may receive and evaluate a response from each customer (e.g., 80, 82, 84, and 86) (e.g., at block 70 and 72) so that the content, (e.g., the pop-up notification 90, the text message notification 94, the application alert 98, and/or the notification block 102) delivered to each respective customer may continually be updated to better suit the needs and information associated with the customer. In some embodiments, for example, after reviewing or submitting the mortgage application, the fourth customer 84 may receive a new list of notifications (e.g., the notification related to the car insurance policy) in the notification block 102 the next time the fourth customer 86 interacts with the application 104. In other embodiments, the third customer 84 may disable application alerts 98, and as such, the content management system 12 may begin to deliver text message notifications 94 instead of application alerts 98 to the third customer 84.

While the embodiments illustrated in FIG. 4 may demonstrate the embodiments of steps included in the method 50 and/or embodiments of the information stored in the databases (e.g., the customer database 14, the customer needs database 16, the actions database 18, and the content database 20), it should be understood to one skilled in the art that these are examples intended to illustrate, not limit, the disclosure.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system for efficiently employing a communication processing system, comprising:
one or more databases comprising information related to a customer;
a processor configured to:
correlate a plurality of needs of the customer to the information related to the customer;
correlate a plurality of corresponding actions to the plurality of needs of the customer, wherein the plurality of corresponding actions would satisfy each of the plurality of needs of the customer;
prioritize the plurality of corresponding actions;
select content that conveys information about a highest priority action of the plurality of corresponding actions;
output a notification with the content to a customer computing device;
monitor a response by the customer to the notification; and
reprioritize the plurality of corresponding actions based at least in part on the response by the customer to the notification and a history of previous responses by the customer to previous notifications.

2. The system of claim 1, wherein the processor is configured to adjust a format of a subsequent notification based at least in part on the customer's response to the notification.

3. The system of claim 1, wherein the plurality of needs comprise one or more products or services that would be potentially useful to the customer based at least in part on the information related to the customer.

4. The system of claim 1, wherein the processor is configured to correlate the plurality of needs and to correlate and prioritize the plurality of corresponding actions in response to receipt of new information related to the customer.

5. The system of claim 4, wherein the processor is configured to select the content and to output the notification in response to receipt of the new information related to the customer.

6. The system of claim 4, wherein the processor is configured to receive a signal indicative of a current location of the customer from a global positioning system, and wherein the new information comprises the current location of the customer.

7. The system of claim 1, wherein the processor is configured to correlate the plurality of needs of the customer, to correlate and prioritize the plurality of corresponding actions, to select the content, and to output the notification in response to detection of a request initiated by the customer to interact with an application running on the customer computing device.

8. The system of claim 1, wherein the processor is configured to correlate the plurality of needs of the customer, to correlate and prioritize the plurality of corresponding actions, to select the content, and to output the notification periodically according to a predetermined schedule.

9. The system of claim 1, wherein the processor is configured to prioritize the plurality of corresponding actions based at least in part on a deadline to complete each of the plurality of corresponding actions and an estimated duration needed to complete each of the plurality of corresponding actions.

10. The system of claim 1, wherein the processor is configured to access preferences of the customer related to prioritization of the plurality of corresponding actions from the one or more databases, and to prioritize the plurality of corresponding actions based at least in part on the preferences.

11. The system of claim 1, wherein the processor is configured to access the preferences of the customer related to a format of the notification from the one or more databases, and to generate the notification based at least in part on the preferences.

12. The system of claim 1, wherein the one or more databases comprise information related to a second customer and the processor is configured to:
correlate a plurality of respective needs of the second customer to the information related to the second customer;
correlate a plurality of respective corresponding actions to the plurality of respective needs of the second customer, wherein the plurality of respective corresponding actions would satisfy each of the plurality of respective needs of the customer;
prioritize the plurality of respective corresponding actions;
select respective content that conveys information about a respective highest priority action of the plurality of respective corresponding actions, wherein the highest priority action for the customer and the respective highest priority action for the second customer are the same; and
output a respective notification with the respective content to a respective customer computing device of the second customer, wherein the notification for the customer and the respective notification for the second customer are different from one another.

13. A system for efficiently employing a communication processing system, comprising:
one or more databases comprising information related to a customer;
a processor configured to:
correlate a plurality of needs of the customer to the information related to the customer in response to receipt of an input;
correlate a plurality of corresponding actions to the plurality of needs of the customer, wherein the plurality of corresponding actions would satisfy the plurality of the needs of the customer;
prioritize the plurality of corresponding actions;
select appropriate content from a content database that relates to a highest priority action of the plurality of corresponding actions and based at least in part on the information related to the customer;
output a notification based at least in part on the selected appropriate content to the customer via a customer computing device;

monitor a response by the customer to the notification; and reprioritize the plurality of corresponding actions based at least in part on the response by the customer to the notification and a history of previous responses by the customer to previous notifications.

14. The system of claim 13, wherein the processor is configured to adjust a format of a subsequent notification based at least in part on the customer's response to the notification.

15. A method for efficiently employing a communication processing system, comprising:

correlating, using a processor, a plurality of needs of a customer to information from a database related to the customer;

correlating, using the processor, a plurality of corresponding actions to the plurality of needs of the customer, wherein the plurality of corresponding actions would satisfy each of the plurality of needs of the customer;

prioritizing, using the processor, the plurality of corresponding actions;

selecting, using the processor, content that conveys information about a highest priority action of the plurality of corresponding actions;

outputting, using the processor, the notification with the content to a customer computing device;

monitoring a response by the customer to the notification; and reprioritizing the plurality of corresponding actions based at least in part on the response by the customer to the notification and a history of previous responses by the customer to previous notifications.

16. The method of claim 15, comprising correlating the plurality of needs of the customer in response to receipt of new information related to the customer at the processor.

17. The method of claim 16, comprising receiving a signal indicative of a current location of the customer from a global positioning system at the processor, wherein the new information comprises the current location of the customer.

18. The method of claim 15, comprising correlating the plurality of needs of the customer in response to detection of a request initiated by the customer to interact with an application running on the customer computing device using the processor.

19. The method of claim 15, comprising prioritizing, using the processor, the plurality of corresponding actions based at least in part on a deadline to complete each of the plurality of corresponding actions, an estimated duration needed to complete each of the plurality of corresponding actions, an importance of completing each of the plurality of corresponding actions, a consequence for failing to complete each of the plurality of corresponding actions, or a combination thereof.

20. The method of claim 15, wherein reprioritizing the plurality of corresponding actions based at least in part on the response by the customer to the notification comprises reducing a priority level of the highest priority action in response to the customer failing to interact with the notification.

\* \* \* \* \*